United States Patent [19]

Lin et al.

[11] Patent Number: 5,164,903
[45] Date of Patent: Nov. 17, 1992

[54] ELECTRONIC CONTROL OF TRACTIVE FORCE PROPORTIONING FOR A CLASS OF FOUR WHEEL DRIVE VEHICLES

[75] Inventors: William C. Lin, Troy; Youssef A. Ghoneim, Mt. Clemens, both of Mich.

[73] Assignee: General Motors Corporation, Detroit, Mich.

[21] Appl. No.: 578,372

[22] Filed: Sep. 7, 1990

[51] Int. Cl.$^5$ ............................................. B60K 28/00
[52] U.S. Cl. ................................ 364/426.03; 180/197; 180/248
[58] Field of Search .................. 180/197, 248, 249; 364/426.03, 426.01, 426.02

[56] References Cited

U.S. PATENT DOCUMENTS

| | | | |
|---|---|---|---|
| 3,713,504 | 1/1973 | Shimer et al. | 180/65.1 |
| 4,439,832 | 3/1984 | Sato et al. | 364/426.02 |
| 4,736,814 | 4/1988 | Yogo et al. | 180/197 |
| 4,884,651 | 12/1989 | Harada et al. | 364/426.03 X |
| 4,936,404 | 6/1990 | Matsumota | 180/197 |
| 4,947,332 | 8/1990 | Ghoneim | 364/426.03 |
| 4,989,685 | 2/1991 | Matsuda | 180/197 |
| 5,009,279 | 4/1991 | Matsuda | 180/197 |
| 5,016,179 | 5/1991 | Utzt | 364/426.03 X |
| 5,024,285 | 6/1991 | Fujita | 180/197 |
| 5,041,978 | 8/1991 | Nakayama et al. | 364/426.03 |
| 5,060,747 | 10/1991 | Eto | 180/197 |
| 5,070,460 | 12/1991 | Yasuno | 180/197 X |
| 5,070,961 | 12/1991 | Tezuka | 180/249 |
| 5,105,360 | 4/1992 | Akiyama | 364/426.03 |

Primary Examiner—Parshotam S. Lall
Assistant Examiner—Thomas S. Auchterlonie
Attorney, Agent, or Firm—Anthony Luke Simon

[57] ABSTRACT

A control method for four wheel drive vehicles in which the front and rear wheels are not mechanically linked controls the drive torque to the vehicle wheels in proportion to vehicle loading and road surface friction coefficients in response to front and rear wheel speeds and front and rear wheel accelerations thereby reducing wheel spin.

9 Claims, 5 Drawing Sheets

ELECTRONIC CONTROL OF TRACTIVE FORCE PROPORTIONING FOR A CLASS OF FOUR WHEEL DRIVE VEHICLES

This invention relates to traction control for a class of four wheel drive vehicles and more particularly to a means and method of electronically proportioning tractive force among the vehicle wheels in response to front and rear wheel speed and acceleration.

BACKGROUND OF THE INVENTION

In four wheel drive vehicles, it is desirable to provide a drive torque to each wheel in relation to the vehicle load on each wheel and the road surface friction coefficient for each wheel to maximize vehicle traction efficiency and reduce chance of tire spin. When there are equal road surface friction coefficients for all four wheels, which is usually the case, minimum wheel spin occurs when the drive torque to each wheel is proportional to the vehicle loading on each wheel.

The state of the art technology for achieving ideal wheel torque proportioning is to use a locked differential between the front and rear axles which results in identical front and rear wheel speeds. Providing identical front and rear wheel speeds is a very effective way of ensuring ideal proportioning of wheel torque and, consequently, tractive force.

For vehicles in which there is no mechanical linkage between the front and rear wheels or any of the wheels, e.g., certain dual engine and electric vehicles, the use of a locked differential for ideal torque proportioning is not applicable. What is desired is a control system for a four wheel vehicle with an independent drive train for each wheel which will provide ideal wheel torque proportioning and ideal tractive force proportioning.

SUMMARY OF THE PRESENT INVENTION

The present invention is a powertrain control system for four wheel drive vehicles that provides ideal tractive torque proportioning by controlling both front and rear wheels to rotate at the same speed. The controller receives signal processing information, including accelerator pedal position and front and rear wheel speeds and accelerations, determines the torque requirements for the front and rear wheels based upon the input signals, and controls the powertrain to deliver the required torque to the wheels.

In one example, the invention can be implemented in a vehicle which has a front engine and a rear engine/motor delivering power to the front and rear wheels through front and rear differentials. In response to accelerator pedal position and speed and acceleration of the two differential input shafts, the controller controls the drive torque to the front and rear wheels by controlling the output of the front and rear engines/motors, e.g., through control of engine throttles.

In a second example, the invention can be implemented in a vehicle which has a separate drive train for each of the four vehicle wheels, such as an electric vehicle with a direct drive DC motor for each wheel. In response to accelerator pedal position and speed and acceleration of the two left wheels, the controller controls the drive torque to the left front and left rear wheels, e.g., through control of the current to the DC drive motors. The same process is repeated for the right front and right rear wheels.

The torque control for the front and rear wheels includes an open-loop and a closed-loop portion. The wheel (front or rear) that is turning slower is controlled in response to the open-loop command from the accelerator pedal position. The wheel that is turning faster is controlled in response to the open-loop command from the accelerator pedal position and the closed-loop command derived from the front and rear wheel speeds and accelerations, to reduce the drive torque to that wheel.

These and other improvements of the present invention are further explained in the detailed description below.

BRIEF DESCRIPTION OF THE DRAWINGS

FIG. 2 is a schematic diagram showing components of the controller and its connections for implementation of the invention in the vehicle depicted in FIG. 1a.

DETAILED DESCRIPTION OF THE INVENTION

Figure 1A:
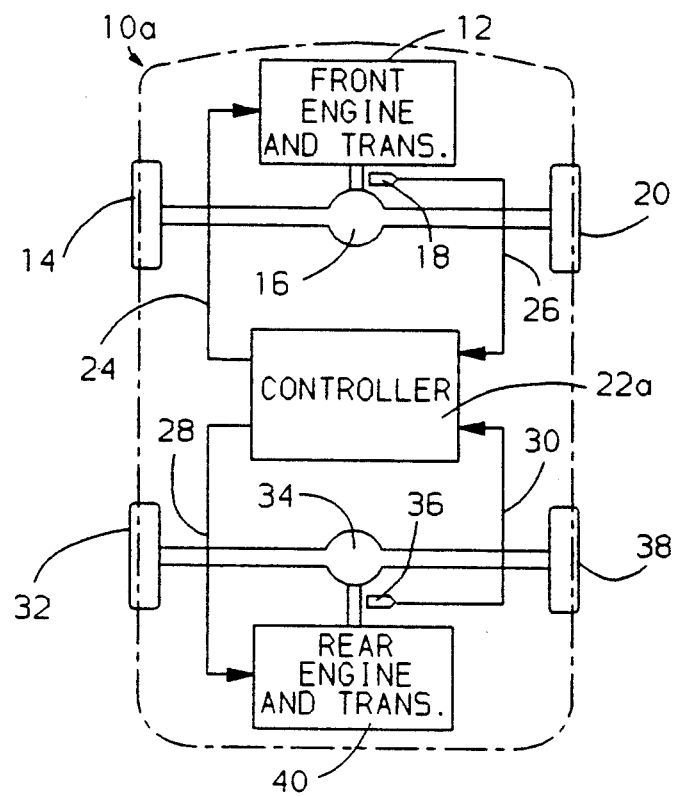
FIG. 1a is a schematic drawing of a four wheel drive vehicle with a controller controlling front and rear powertrains which drive front and rear wheels through front and rear differentials.

In the general control method of the present invention, the accelerator pedal position is input and used as the open loop torque command, $T_p$. The front and rear wheel speeds, $\omega_f$ and $\omega_r$, and front and rear wheel accelerations, $\alpha_f$ and $\alpha_r$, are measured to determine the closed loop torque command, $T_{fb}$, according to the following equation:

$$T_{fb} = K_p(\omega_r - \omega_f) + K_\alpha(\alpha_r - \alpha_f),$$

where $K_p$ and $K_\alpha$ are proportionality constants which may be tailored to meet the desired performance of a particular vehicle. In general, the larger the proportionality constants, $K_p$ and $K_\alpha$, the faster the response of the system. However, large proportionality constants tend to provide rides which may be characterized by brief repetitive periods of sudden accelerations and decelerations. By reducing the proportionality constants, a smoother ride can be obtained at a sacrifice to response speed.

A comparison is made between the front wheels and the rear wheel speeds to determine the difference in speed, if any. The preferred method is done by finding a wheel speed ratio $\omega_f/\omega_r$ and comparing that ratio to a predetermined constant, $R_{th}$, e.g., $R_{th} + 1.05$, to determine if any torque correction is desired. If the wheel speed ratio is less than $R_{th}$ and the inverse of the wheel speed ratio, $\omega_r/\omega_f$, is less than $R_{th}$, then no torque correction is required. In the case where no torque correction is required, the open loop torque command, $T_p$, is applied to both the front and rear wheels.

If the wheel speed ratio is greater than the predetermined constant, $R_{th}$, then torque correction is applied to the front wheels, which are spinning faster than the rear wheels. If the inverse wheel speed ratio is greater than $R_{th}$, then torque correction is applied to the rear wheels, which are spinning faster than the front wheels.

In the event that the front wheels are spinning faster than the rear wheels, the open loop torque command, $T_p$, is applied to the rear wheels. The sum of the open loop torque command and the closed loop torque command, $T_p + T_{fb}$, is applied to the front wheels, reducing the torque drive to the front wheels and reducing the front wheel spin.

In the event that the rear wheels are spinning faster that the front wheels, the open loop torque command, $T_p$, is applied to the front wheels. The sum of the open loop torque command and the negative of the closed loop torque command, $T_p - T_{fb}$, is applied to the rear wheels, reducing the torque drive to the rear wheels and reducing rear wheel spin. By reducing torque to the wheel that is spinning, wheel spin can be eliminated. Through implementation of this method, each wheel provides a drive torque and tractive force for the vehicle proportional to both the vehicle loading on the wheel and the friction coefficient between the wheel and the road surface.

The above described method is suitable for implementation into several types of vehicles, examples of which are described below.

EXAMPLE 1

Referring to FIG. 1a, the vehicle 10a has a front engine and transmission 12 driving front wheels 14 and 20 through differential 16. A rear engine and transmission 40 drives the rear wheels 32 and 38 through differential 34. The engines are internal combustion engines with throttles (see FIG. 2) controlled by controller 22a through lines 24 and 28. The average front wheel speed and acceleration are sensed by sensor 18 at the input shaft to the front differential 16 and fed back to the controller 22a through line 26. The average rear wheel speed and acceleration are sensed by sensor 36 at the input shaft to the rear differential 34 and fed back to the controller 22a through line 30. The sensors 18 and 36 are preferably hall effect sensors detecting the rotation of the differential input shafts but may also be magnetoresistive sensors, variable reluctance sensors, or any other suitable sensor.

Figure 2:
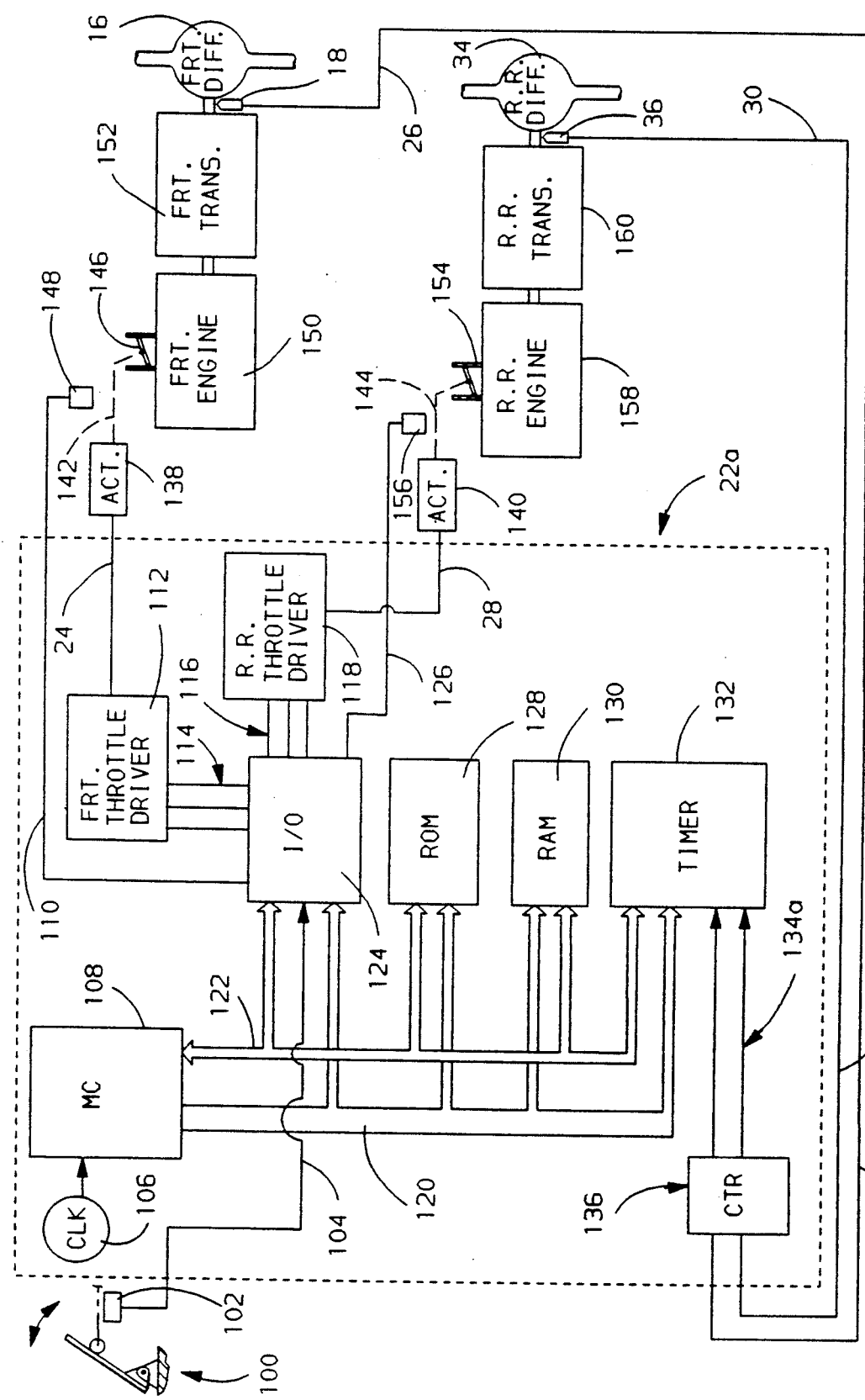

Referring to FIG. 2, the controller 22a includes the clock 26, microcomputer 108, front and rear throttle drivers 112 and 118, input/output unit 124, ROM and RAM memory units 128 and 130, timer 132 and counter 136. The microcomputer 108 executes the control program stored in read only memory 128 at a frequency determined by clock 106. The microcomputer controls the input/output unit 124, ROM 128, RAM 130 and timer 132 through control bus 120 and transfers data between the units through bi-directional data bus 122.

The accelerator pedal 100 has a position sensed by sensor 102, which may be a potentiometer, optical encoder, or any other suitable position sensor. A signal representative of the accelerator pedal position is input to the input/output unit 124 through line 104 and a number representative of the gas pedal position is stored in the RAM 130.

The counter 136 receives pulses indicative of differential input shaft rotations through lines 26 and 30. The counter supplies the counts to the timer 132 through lines 134a. With the information from the counter 136 and the timer 132, the microcomputer 108 can determine the average front and rear wheel speeds, $\omega_f$ and $\omega_r$, and the average front and rear wheel accelerations, $a_f$ and $a_r$, and store the speed and acceleration information in RAM 130.

In response to the front and rear wheel speeds and accelerations, the microcomputer 108 determines the desired torque output for the front and rear wheels in accordance with the method set forth above. The input/output unit 124 outputs the torque commands to the front and rear throttle drivers 112 and 118 through control buses 114 and 116. The front throttle driver sends a control signal through line 24 to drive actuator 138, preferably a stepper motor, which controls the position of the front engine throttle 146 through actuator shaft 142. The throttle position is sensed by sensor 148 and fed back to the controller 22a through line 110.

The front throttle 146 controls the power output of the front engine 150 which delivers power, at the desired torque, to the front wheels (not shown) through the front transmission 152 and front differential 16.

Likewise the rear throttle driver sends a control signal through line 28 to the rear actuator 140, also preferably a stepper motor, which controls the position of the rear throttle 154 through movement of the actuator shaft 144. The rear throttle position is sensed by sensor 156 and fed back to the controller 22a through line 126. The rear throttle 154 controls the power output of the rear engine 158 which delivers power, at the desired torque, to the rear wheels (not shown) through the rear transmission 160 and rear differential 34.

Figure 4:
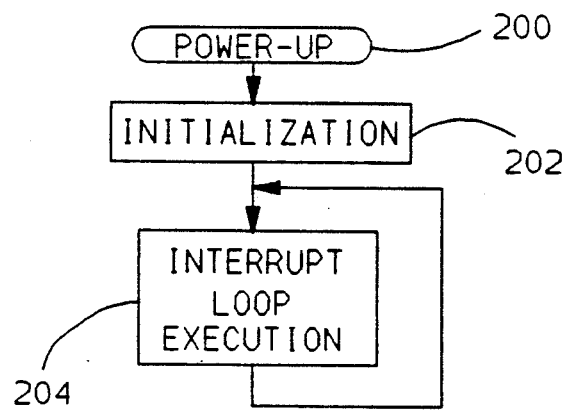
FIG. 4 is a basic flow diagram of a torque control routine.

Referring to FIG. 4, the control program implemented by the microcomputer is powered up and initialized, 200 and 202, when the vehicle operator turns the ignition key. During execution of the initialization routine, various variables, such as the counter contents and front and rear control status are reset. Additionally, the necessary start-up sequences for operation of the microcomputer, which are well known to those skilled in the art, are performed. After initialization, the microcomputer enters the control loop 204 to execute the algorithms based on a predetermined interrupt interval, preferably 10 ms.

Figure 5:
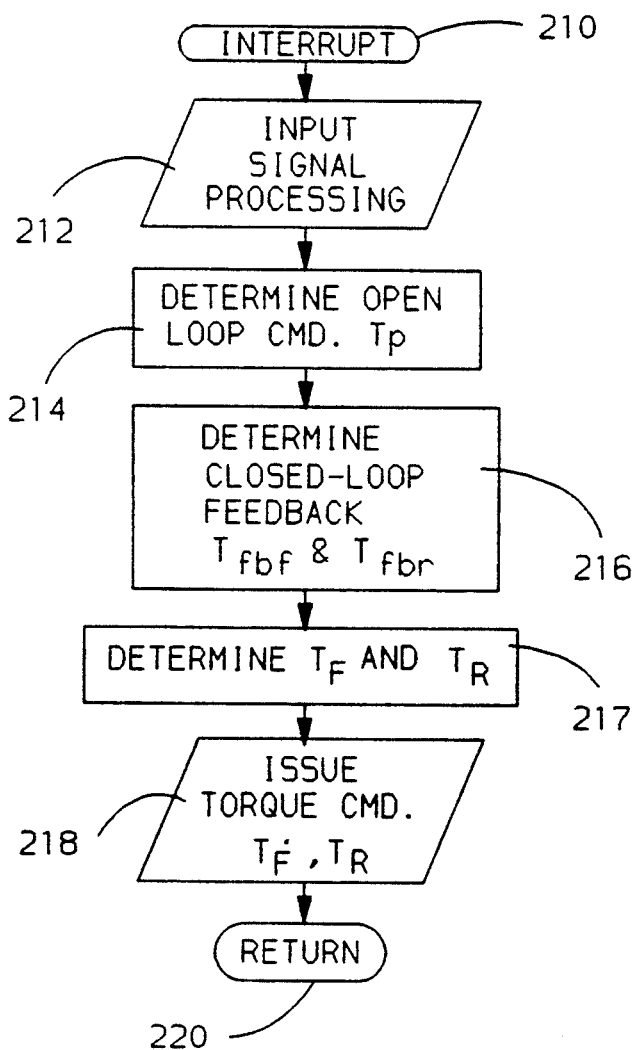
FIG. 5 is a flow diagram of the interrupt loop of a torque control routine.

Referring to FIG. 5, the microcomputer enters the interrupt routine at step 210 and at step 212, receives input signals and performs input signal processing. The input signals include information from the counter, timer, and accelerator pedal (136, 132, and 100 in FIG. 2). At step 214, the open loop torque command, $T_p$, is determined in response to the accelerator pedal position. The open loop torque command is usually directly proportional to accelerator pedal position but different transfer functions between the accelerator pedal position and open loop torque command may be designed to achieve particular vehicle performances. For example, large torque output may be desired when the accelerator pedal is initially depressed so that the vehicle "jumps" at initial acceleration, and this can easily be programmed into the open loop torque command control by one skilled in the art.

At step 216, the closed loop torque commands, for the front and rear wheels, $T_{fbf}$ and $T_{fbr}$, are determined. At step 218, the front and rear torque commands, $T_F$ and $T_R$, which are determined at step 217, are output to control the front and rear engines 12 and 40 to reducing wheel spin and achieving proper tractive force proportioning among the wheels. At step 220, the program returns out of the interrupt loop.

Figure 6:
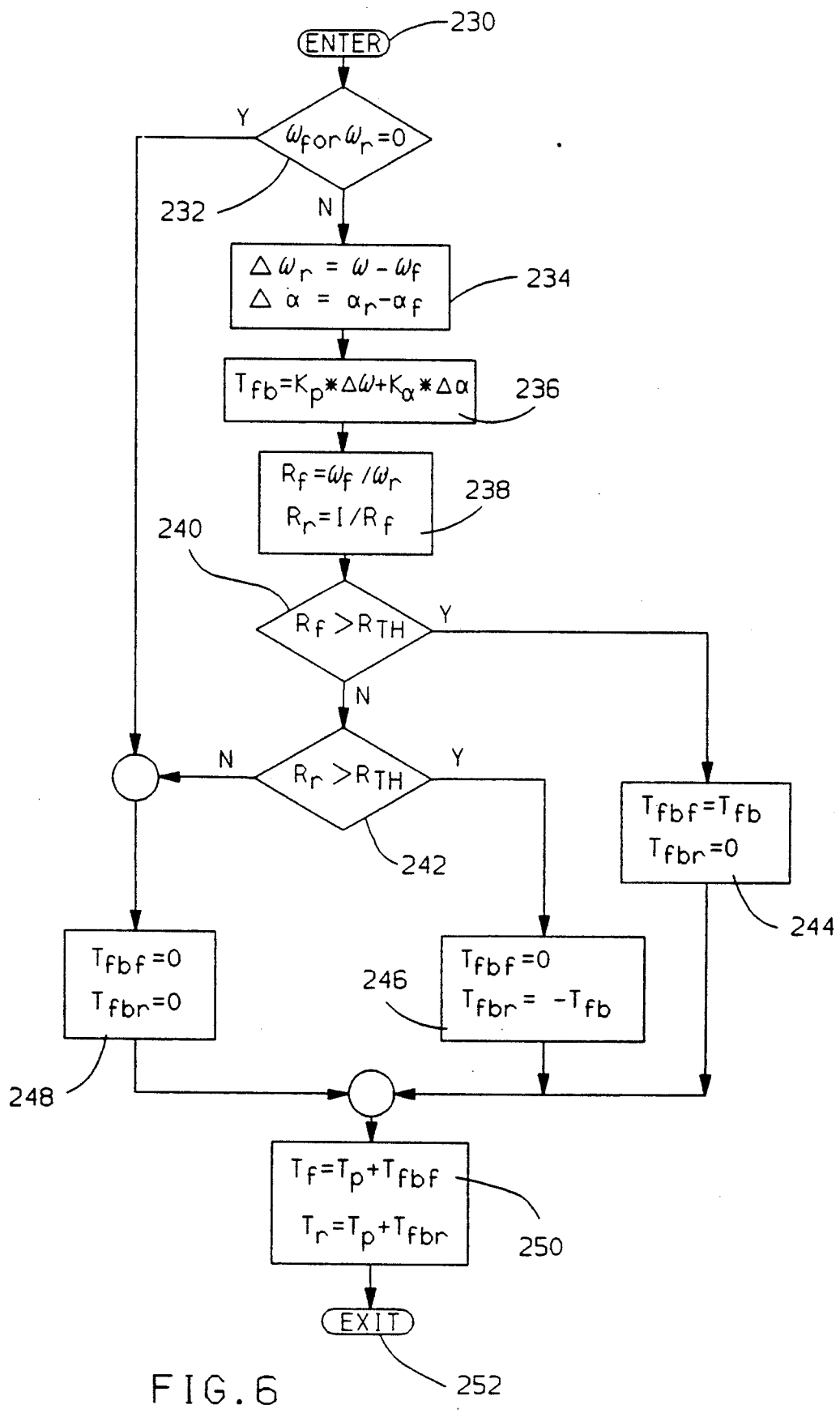
FIG. 6 is a detailed flow diagram of a routine for determining the front and rear torque commands.

Referring to FIG. 6, the preferred implementation for determining the front and rear torque commands, $T_F$ and $T_R$, starts at step 230. At step 232, the microcomputer tests to determine if either the average front or average rear wheel speed ($\omega_f$ or $\omega_r$) is zero. If either the front or rear average wheel speeds is zero, then the closed loop torque commands for both the front and the rear wheels, $T_{fbf}$ and $T_{fbr}$, are set to zero at step 248 and the front and rear torque commands, $T_F$ and $T_R$, are set to the open loop torque command, $T_p$, at step 250.

If neither the front nor the rear average wheel speed is zero at step 232, then the computer moves to step 234 where it determines the average speed difference, $\Delta\omega = \omega_r - \omega_f$, and the average acceleration difference, $\Delta a = a_r - a_f$, between the front and rear wheels. At step 236, the controller determines the closed loop torque command, $T_{fb} + K_p\Delta\omega + K_{60}\Delta a$. At step 238, the controller finds the front to rear average wheel speed ratio, $R_f = \omega_f/\omega_r$, and the rear to front average wheel speed ratio, $R_r = 1/R_f$.

The controller, at step 240, tests the front to rear average wheel speed ratio, $R_f$, against a predetermined constant, $R_{th}$, preferably 1.05, to determine if torque correction should be applied to the front wheels. If the front to rear average wheel speed ratio is greater than $R_{th}$, then the front closed loop torque command, $T_{fbf}$, is set equal to the closed loop torque command, $T_{fb}$ at step 244 and the rear closed loop torque command, $T_{fbr}$, is set to zero.

If, at step 240, the front to rear average wheel speed ratio, $R_f$, is not greater than the predetermined constant, $R_{th}$, then the rear to front average wheel speed ratio, $R_r$, is compared to the predetermined constant, $R_{th}$, at step 242. If the rear to front average wheel speed ratio is greater than $R_{th}$, then the front closed loop torque command, $T_{fbf}$, is set to zero and the rear closed loop torque command, $T_{fbr}$, is set equal to the negative of the closed loop torque command, $-T_{fb}$, at step 246. If, at step 242, the rear to front average wheel speed ratio, $R_r$, is not greater than the predetermined constant, $R_{th}$, then both the front and rear closed loop torque commands, $T_{fbf}$ and $T_{fbr}$, are set to zero at step 248.

At step 250 the front torque command, $T_F$, is set equal to the sum of the open loop torque command and the front closed loop torque command, $T_F = T_p + T_{fbf}$. The rear torque command, $T_R$, is set equal to the sum of the open loop torque command and the rear closed loop torque command, $T_R + T_p + T_{fbr}$. The torque command determination routine is then exited at step 252.

In this first example, the front and rear engines 150 and 158 (FIG. 2) need not be internal combustion engines. One or both of the engines may be an electric motor powered through reserve batteries or through an internal combustion engine driving an electric generator. In such cases, the throttle control is replaced by any suitable electric motor control, and is easily implemented by one skilled in the art. Various other modifications to the control system and method in the above example will occur to those skilled in the art.

EXAMPLE 2

Figure 1B:
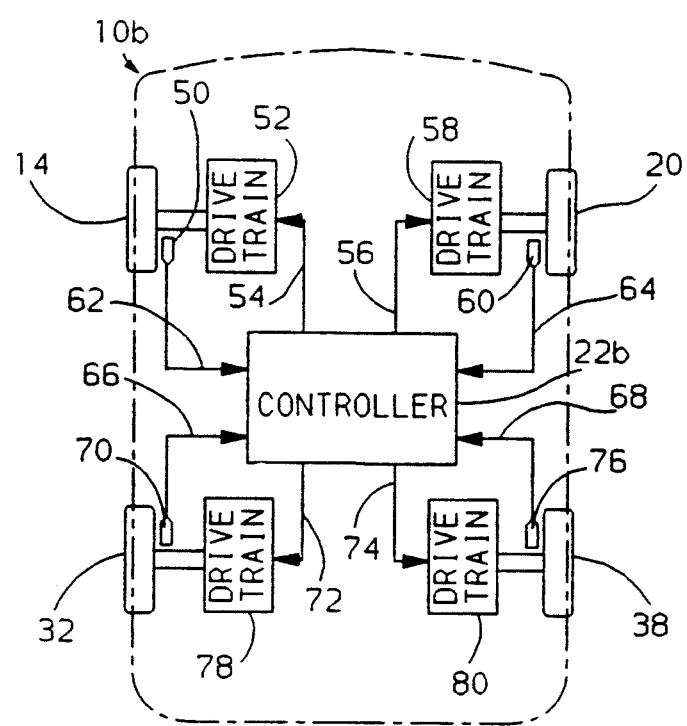
FIG. 1b is a schematic drawing of a four wheel drive vehicle with a controller controlling separate power trains for each wheel.

Referring to FIG. 1b, the vehicle 10b has an independent drive train (52, 58, 78 and 80) for each wheel and represents the preferred implementation of the present invention. Each of the drive trains 52, 58, 78, and 80 is preferably a brushless DC motor utilizing rare earth permanent magnets, preferably iron-neodynium-baron magnets, available under the trade name "Magnaquench" (Registered Trademark) from Delco Remy Division of General Motors Corporation. Each of the DC brushless motors 52, 58, 78, and 80 is controlled by controller 22b through control lines 54, 56, 72 and 74, respectively. The rotational speed of each wheel is measured by sensors 50, 60, 70, and 76 (similar to sensors 18 and 36 in FIG. 1a) and fed back to the controller 22b through lines 62, 64, 66, and 68.

Figure 3:
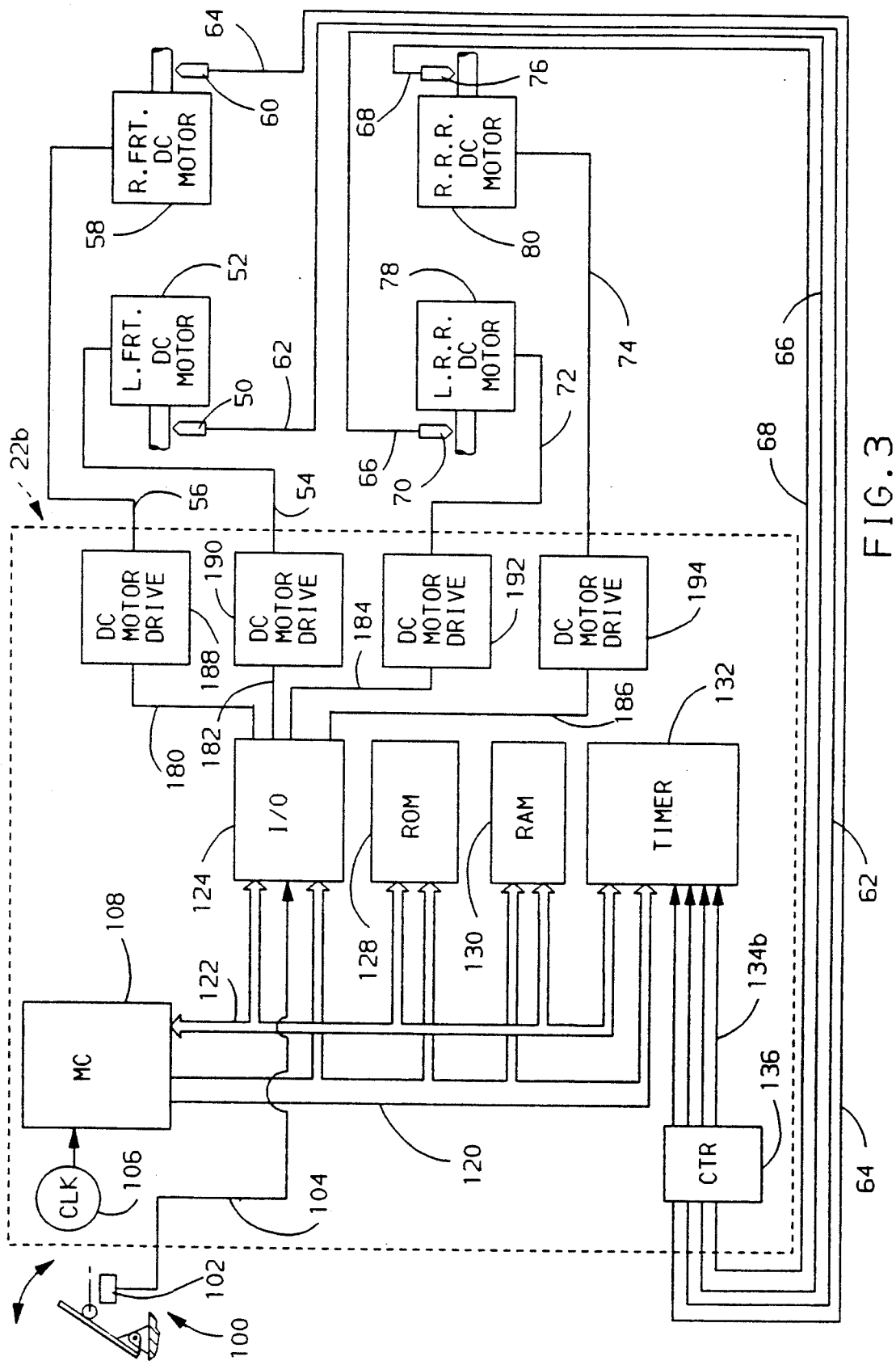
FIG. 3 is a schematic diagram showing components of the controller and its connections for implementation of the invention in the vehicle depicted in FIG. 1b.

Referring to FIG. 3, the controller 22b for the vehicle 10b (FIG. 1b) is similar to the controller 22a in FIG. 2. The counter 136, however, receives four inputs from the four sensors 50, 60, 70, and 76 through lines 62, 64, 66, and 68, respectively. The counter 136 keeps track of the number of rotations of the four wheels and feeds that information to the timer 132 through lines 134b.

When the controller executes the control program implementing the method of the invention, the torque control routine is computed once for the left two vehicle wheels (14 and 32 in FIG. 1b) and once for the right two vehicle wheels (20 and 38 in FIG. 1b).

Once the desired output torques are computed, the input/output unit 124 outputs the torque commands through output buses 180, 182, 184, and 186 to the DC motor controllers 188, 190, 192 and 194. The DC motor controllers 188, 190, 192, and 194 control the torque output of the brushless DC motors 58, 52, 78, and 80 through variation of the control current in lines 56, 54, 72 and 74, respectively. To reduce the torque output of any of the DC motors, the current supplied to that motor is reduced.

Referring to FIG. 4, the control program for vehicle 10b (FIG. 1b) is similar to the control program for vehicle 10a (FIG. 1a). The interrupt routine depicted in FIG. 5 is run twice, in succession, once for the left two vehicle wheels and once for the right two vehicle wheels. The same loop may be repeated with different variables for the left and right wheels or there may be two similar loops in the control program, either implementation is preferable and easily implemented by one skilled in the art. Because the four wheels have independent drives, the interrupt loop determines four closed loop feedback commands, $T_{fbfl}$, $T_{fbrl}$, $T_{fbfr}$ and $T_{fbrr}$, for the front left, rear left, front right and rear right wheels, respectively. At step 218, the controller also issues four torque commands for the front left, rear left, front right and rear right wheels, $T_{Fl}$, $T_{Rl}$, $T_{Fr}$ and $T_{Rr}$, which were determined at step 217, respectively.

Referring to FIG. 6, the torque command computation routine is run twice, once computing the torque commands for the left vehicle wheels, $T_{Fl}$ and $T_{Rl}$, and once computing the torque commands for the right vehicle wheels, $T_{Fr}$ and $T_{Rr}$. In the first performance of the torque command computation routine, the left front and left rear wheel speeds and accelerations are used to determine the left torque feedback commands, $T_{fbfl}$ and $T_{fbrl}$, in, the same manner that the front and rear torque feedback commands were determined in example 1. The left front and left rear torque commands, $T_{Fl}$ and $T_{Rl}$, are the sums of the open loop torque command, $T_p$ (same as in example 1), and the left front and left rear torque feedback commands, $T_{Fl} = T_p + T_{fbfl}$ and $T_{Rl} = T_p + T_{fbrl}$.

Likewise, in the second performance of the torque command computation routine, the right front and right rear wheel speeds and accelerations are used to determine the right torque feedback commands, $T_{fbfr}$ and $T_{fbrr}$, in a similar manner and the right front and right rear torque commands, $T_{Fr}$ and $T_{Rr}$, are computed, $$T_{Fr} = T_p + T_{fbfr}, \quad T_{Rr} = T_p + T_{fbrr}.$$

This example includes a vehicle in which the power for motors 52, 58, 78 and 80 is supplied by reserve batteries, as well as an internal combustion engine which drives an electric generator, as in hybrid vehicles.

The present invention is not limited to the above described examples but encompasses the use of front and rear wheel speed and acceleration to proportion the drive torque of the vehicle wheels in relation to vehicle wheel loading. Other improvements and/or modifications to the present invention may occur to those skilled in the art and fall within the scope of the invention as set forth below.

The embodiments of the invention in which an exclusive property or privilege is claimed are defined as follows:

1. A method for controlling tractive force proportioning for a four wheel drive vehicle with two front wheels and two rear wheels and separate front and rear wheel drive torque controls, and in which the front and rear wheel drive torque controls are signal-responsive to controllably reduce drive torque to the front and rear wheels, comprising the steps:

determining measures of front wheel speed, $\omega_f$, front wheel acceleration, $\alpha_f$, rear wheel speed, $\omega_r$, and rear wheel acceleration, $\alpha_r$;

calculating a torque feedback signal, $T_{fb}$, in response to the measures of front and rear wheel speeds, $\omega_f$ and $\omega_r$, and front and rear wheel accelerations, $\alpha_f$ and $\alpha_r$, according to the equation:

$$T_{fb} = K_p(\omega_r - \omega_f) + K_a(\alpha_r - \alpha_f),$$

where $K_p$ and $K_{60}$ are proportionality constants;

applying the torque feedback signal, $T_{fb}$, to the front wheel torque control if the front wheel speed is greater than the rear wheel speed to reduce the amount of drive torque to the front wheels; and applying a negative of the torque feedback signal, $-T_{fb}$, to the rear wheel torque control if the rear wheel speed is greater than the front wheel speed to reduce the amount of drive torque to the rear wheels.

2. A method for controlling tractive force proportioning for a four wheel drive vehicle with two front wheels and two rear wheels and separate front and rear wheel drive torque controls, and in which the front and rear wheel drive torque controls are signal-responsive to controllably reduce drive torque to the front and rear wheels, comprising the steps:

determining measures of front wheel speed, $\omega_f$, front wheel acceleration, $\alpha_f$, rear wheel speed, $\omega_r$, and rear wheel acceleration, $\alpha_r$;

calculating a torque feedback signal, $T_{fb}$, in response to the measures of front and rear wheel speeds, $\omega_f$ and $\omega_r$, and front and rear wheel accelerations, $\alpha_f$ and $\alpha_r$;

applying the torque feedback signal, $T_{fb}$, to the front wheel torque control if the front wheel speed is greater than the rear wheel speed to reduce the amount of drive torque to the front wheels; and applying a negative of the torque feedback signal, $-T_{fb}$, to the rear wheel torque control if the rear wheel speed is greater than the front wheel speed to reduce the amount of drive torque to the rear wheels, wherein the torque feedback signal, $T_{fb}$, is set to zero if both (1) a proportion defined as $\omega_f/\omega_r$ is less than a predetermined constant, $R_{th}$, and (2) a proportion defined as $\omega_r/\omega_f$ is less than the predetermined constant, $R_{th}$, whereby there is no reduction of drive torque to any of the wheels.

3. A method for controlling tractive force proportioning for a four wheel drive vehicle with two front wheels and two rear wheels and separate front and rear wheel drive torque controls, and in which the front and rear wheel drive torque controls are signal-responsive to controllably reduce drive torque to the front and rear wheels, comprising the steps:

determining measures of front wheel speed, $\omega_f$, front wheel acceleration, $\alpha_f$, rear wheel speed, $\omega_r$, and rear wheel acceleration, $\alpha_r$;

calculating a torque feedback signal, $T_{fb}$, in response to the measures of front and rear wheel speeds, $\omega_f$ and $\omega_r$, and front and rear wheel accelerations, $\alpha_f$ and $\alpha_r$;

applying the torque feedback signal, $T_{fb}$, to the front wheel torque control if the front wheel speed is greater than the rear wheel speed to reduce the amount of drive torque to the front wheels; and applying a negative of the torque feedback signal, $-T_{fb}$, to the rear wheel torque control if the rear wheel speed is greater than the front wheel speed to reduce the amount of drive torque to the rear wheels, wherein the torque feedback signal, $T_{fb}$, is set to zero if $\omega_f$ equals zero; and the torque feedback signal, $T_{fb}$, is set to zero if $\omega_r$ equals zero.

4. A method for controlling tractive force proportioning for a four wheel drive vehicle with two front wheels and two rear wheels and separate front and rear wheel drive torque controls, comprising the steps:

determining measures of front wheel speed, $\omega_f$, front wheel acceleration, $\alpha_f$, rear wheel speed, $\omega_r$, and rear wheel acceleration, $\alpha_r$;

calculating a torque feedback signal, $T_{fb}$, in response to the measures of front and rear wheel speeds, $\omega_f$ and $\omega_r$, and front and rear wheel accelerations, $\alpha_f$ and $\alpha_r$;

determining an open loop torque command, $T_p$, responsive to an operator input;

summing the torque feedback signal, $T_{fb}$, with the open loop torque command, $T_p$, to define a front torque command, $T_F$, if the front wheel speed is greater than the rear wheel speed;

defining the front torque command, $T_F$, equal to the open loop torque command, $T_p$, if the rear wheel speed is greater than the front wheel speed;

applying the front torque command, $T_F$, to the front wheel torque control;

summing the negative of the torque feedback signal, $-T_{fb}$, with the open loop torque command, $T_p$, to define a rear torque command, $T_R$, if the rear wheel speed is greater than the front wheel speed;

defining the rear torque command, $T_R$, equal to the open loop torque command, $T_p$, if the front wheel speed is greater than the rear wheel speed; and applying the rear torque command, $T_R$, to the rear wheel torque control.

5. A method for controlling tractive force proportioning for a four wheel drive vehicle with two front wheels and two rear wheels and separate drive torque controls for each wheel, and in which the front and rear wheel drive torque controls are signal-responsive to controllably reduce drive torque to the front and rear wheels, comprising the steps:

determining measures of left and right front wheel speeds, $\omega_{fl}$ and $\omega_{fr}$, left and right front wheel accelerations, $\alpha_{fl}$ and $\alpha_{fr}$, left an right rear wheel speeds, $\omega_{rl}$ and $\omega_{rr}$, and left and right rear wheel accelerations, $\alpha_{rl}$ and $\alpha_{rr}$;

calculating a left torque feedback signal, $T_{fbl}$, in response to the measures of left wheel speeds, $\omega_{fl}$ and $\omega_{rl}$, and left wheel accelerations, $\alpha_{fl}$ and $\alpha_{rl}$, according to the equation:

$$T_{fbl} = K_p(\omega_{rl} - \omega_{fl}) + K_\alpha(\alpha_{rl} - \alpha_{fl}),$$

where $K_p$ and $K_\alpha$ are proportionality constants;

calculating a right torque feedback signal, $T_{fbr}$, in response to the measures of right wheel speeds, $\omega_{fr}$ and $\omega_{rr}$, and right wheel accelerations, $\alpha_{fr}$ and $\alpha_{rr}$, according to the equation:

$$T_{fbl} = K_p(\omega_{rr} - \omega_{fr}) + K_\alpha(\alpha_{rr} - \alpha_{fr}).$$

applying the left torque feedback signal, $T_{fbl}$, to the left front wheel torque control if the left front wheel speed is greater than the left rear wheel speed to reduce the amount of drive torque to the left front wheel;

applying a negative of the left torque feedback signal, $-T_{fbl}$, to the left rear wheel torque control if the left rear wheel speed is greater than the left front wheel speed to reduce the amount of drive torque to the left rear wheel;

applying the right torque feedback signal, $T_{fbr}$, to the right front wheel torque control if the right front wheel speed is greater than the right rear wheel speed to reduce the amount of drive torque to the right front wheel; and applying a negative of the right torque feedback signal, $-T_{fbr}$, to the right rear wheel torque control if the right rear wheel speed is greater than the right front wheel speed to reduce the amount of drive torque to the right rear wheel.

6. A method for controlling tractive force proportioning for a four wheel drive vehicle with two front wheels and two rear wheels and separate drive torque controls for each wheel, and in which the front and rear wheel drive torque controls are signal-responsive to controllably reduce drive torque to the front and rear wheels, comprising the steps:

determining measures of left and right front wheel speeds, $\omega_{fl}$ and $\omega_{fr}$, left and right front wheel accelerations, $\alpha_{fl}$ and $\alpha_{fr}$, left and right rear wheel speeds, $\omega_{rl}$ and $\omega_{rr}$, and left and right rear wheel accelerations, $\alpha_{rl}$ and $\alpha_{rr}$;

calculating a left torque feedback signal, $T_{fbl}$, in response to the measures of left wheel speeds, $\omega_{fl}$ and $\omega_{rl}$, and left wheel accelerations, $\alpha_{fl}$ and $\alpha_{rl}$;

calculating a right torque feedback signal, $T_{fbr}$, in response to the measures of right wheel speeds, $\omega_{fr}$ and $\omega_{rr}$, and right wheel accelerations, $\alpha_{fr}$ and $\alpha_{rr}$;

applying the left torque feedback signal, $T_{fbl}$, to the left front wheel torque control if the left front wheel speed is greater than the left rear wheel speed to reduce the amount of drive torque to the left front wheel;

applying a negative of the left torque feedback signal, $-T_{fbl}$, to the left rear wheel torque control if the left rear wheel speed is greater than the left front wheel speed to reduce the amount of drive torque to the left rear wheel;

applying the right torque feedback signal, $T_{fbr}$, to the right front wheel torque control if the right front wheel speed is greater than the right rear wheel speed to reduce the amount of drive torque to the right front wheel; and applying a negative of the right torque feedback signal, $-T_{fbr}$, to the right rear wheel torque control if the right rear wheel speed is greater than the right front wheel speed to reduce the amount of drive torque to the right rear wheel, wherein the left torque feedback signal, $T_{fbl}$, is set to zero if both (1) a proportion defined as $\omega_{fl}/\omega_{rl}$ is less than a predetermined constant, $R_{th}$, and (2) a proportion defined as $\omega_{rl}/\omega_{fl}$ is less than the predetermined constant, $R_{th}$, whereby there is no reduction of drive torque to either the left front or left rear wheels; and the right torque feedback signal, $T_{fbr}$, is set to zero if both (1) a proportion defined as $\omega_{fr}/\omega_{rr}$ is less than the predetermined constant, $R_{th}$, and (2) a proportion defined as $\omega_{rr}/\omega_{fr}$ is less than the predetermined constant, $R_{th}$, whereby there is no reduction of drive torque to either the right front or right rear wheels.

7. A method for controlling tractive force proportioning for a four wheel drive vehicle with two front wheels and two rear wheels and separate drive torque controls for each wheel, in which the front and rear wheel drive torque controls are signal-responsive to controllably reduce drive torque to the front and rear wheels, comprising the steps:

determining measures of left and right front wheel speeds, $\omega_{fl}$ and $\omega_{fr}$, left and right front wheel accelerations, $\alpha_{fl}$ and $\alpha_{fr}$, left and right rear wheel speeds, $\omega_{rl}$ and $\omega_{rr}$, and left and right rear wheel accelerations, $\alpha_{rl}$ and $\alpha_{rr}$;

calculating a left torque feedback signal, $T_{fbl}$, in response to the measures of left wheel speeds, $\omega_{fl}$ and $\omega_{rl}$, and left wheel accelerations, $\alpha_{fl}$ and $\alpha_{rl}$;

calculating a right torque feedback signal, $T_{fbr}$, in response to the measures of right wheel speeds, $\omega_{fr}$ and $\omega_{rr}$, and right wheel accelerations, $\alpha_{fr}$ and $\alpha_{rr}$;

applying the left torque feedback signal, $T_{fbl}$, to the left front wheel torque control if the left front wheel speed is greater than the left rear wheel speed to reduce the amount of drive torque to the left front wheel;

applying a negative of the left torque feedback signal, $-T_{fbl}$, to the left rear wheel torque control if the left rear wheel speed is greater than the left front wheel speed to reduce the amount of drive torque to the left rear wheel;

applying the right torque feedback signal, $T_{fbr}$, to the right front wheel torque control if the right front wheel speed is greater than the right wheel speed to reduce the amount of drive torque to the right front wheel; and applying a negative of the right torque feedback signal, $-T_{fbr}$, to the right rear wheel torque control if the right rear wheel speed is greater than the right front wheel speed to reduce the amount of drive torque to the right rear wheel, wherein the right torque feedback signal, $T_{fbr}$, is set to zero if $\omega_{fr}$ equals zero;

the right torque feedback signal, $T_{fbr}$, is set to zero if $\omega_{rr}$ equals zero;

the left torque feedback signal, $T_{fbl}$, is set to zero if $\omega_{fl}$ equals zero; and the left torque feedback signal, $T_{fbl}$, is set to zero if $\omega_{rl}$ equals zero.

8. A method for controlling tractive force proportioning for a four wheel drive vehicle with two front wheels and two rear wheels and separate drive torque controls for each wheel, comprising the steps:

determining measures of left and right front wheel speeds, $\omega_{fl}$ and $\omega_{fr}$, left and right front wheel accelerations, $\alpha_{fl}$ and $\alpha_{fr}$, left and right rear wheel speeds, $\omega_{rl}$ and $\omega_{rr}$, and left and right rear wheel accelerations, $\alpha_{rl}$ and $\alpha_{rr}$;

calculating a left torque feedback signal, $T_{fbl}$, in response to the measures of left wheel speeds, $\omega_{fl}$ and $\omega_{rl}$, and left wheel accelerations, $\alpha_{rl}$ and $\alpha_{rl}$;

calculating a right torque feedback signal, $T_{fbr}$, in response to the measures of right wheel speeds, $\omega_{fr}$ and $\omega_{rr}$, and right wheel accelerations, $\alpha_{fr}$ and $\alpha_{rr}$;

determining an open loop torque command, $T_p$, responsive to an operator input;

summing the left torque feedback signal, $T_{fbl}$, with the open loop torque command, $T_p$, to define a left front torque command, $T_{fl}$, if the left front wheel speed is greater than the left rear wheel speed;

defining the left front torque command, $T_{fl}$, equal to the open loop torque command, $T_p$, if the left rear wheel speed is greater than the left front wheel speed;

driving the left front wheel according to the left front torque command, $T_{fl}$;

summing the negative of the left torque feedback signal, $-T_{fbl}$, with the open loop torque command, $T_p$ to define a left rear torque command, $T_{Rl}$, if the left rear wheel speed is greater than the left front wheel speed;

defining the left rear torque command, $T_{Rl}$, equal to the open loop torque command, $T_p$ if the left front wheel speed is greater than the left rear wheel speed;

driving the left rear wheel according to the left rear torque command, $T_{rl}$;

summing the right torque feedback signal, $T_{fbr}$, with the open loop torque command, $T_p$, to define a right front torque command, $T_{Fr}$, if the right front wheel speed is greater than the right rear wheel speed;

defining the right front torque command, $T_{Fr}$, equal to the open loop torque command, $T_p$, if the right rear wheel speed is greater than the right front wheel speed;

driving the right front wheel according to the right front torque command, $T_{Fr}$;

summing the negative of the right torque feedback signal, $-T_{fbr}$, with the open loop torque command, $T_p$, to define a right rear torque command, $T_{Rr}$, if the right rear wheel speed is greater than the right front wheel speed;

defining the right rear torque command, $T_{Rr}$, equal to the open loop torque command, $T_p$, if the right front wheel speed is greater than the right rear wheel speed; and driving the right rear wheel according to the right rear torque command, $T_{Rr}$.

9. A method for controlling tractive force proportioning in a vehicle with four wheels, including a left front wheel, a right front wheel, a left rear wheel, and a right rear wheel, and with separate drives and separate drive controls for each wheel, the method comprising the steps:

determining an open loop torque command, $T_p$, in response to operator input;

determining measures of left and right front wheel speeds, $\omega_{fl}$ and $\omega_{fr}$, left and right front wheel accelerations, $\alpha_{fl}$ and $\alpha_{fr}$, left and right rear wheel speeds, $\omega_{rl}$ and $\omega_{rr}$, and left and right rear wheel accelerations, $\alpha_{rl}$ and $\alpha_{rr}$;

calculating a left torque feedback signal, $T_{fbl}$, in response to the measures of left wheel speeds, $\omega_{fl}$ and $\omega_{rl}$, and left wheel accelerations, $\alpha_{rl}$ and $\alpha_{rl}$, according to the equation:

$$T_{fbl} = K_p(\omega_{rl} - \omega_{fl}) + K_\alpha(\alpha_{rl} - \alpha_{fl}),$$

where $K_p$ and $K_\alpha$ are proportionality constants;

calculating a right torque feedback signal, $T_{fbr}$, in response to the measures of right wheel speeds, $\omega_{fr}$ and $\omega_{rr}$, and right wheel accelerations, $\alpha_{fr}$ and $\alpha_{rr}$, according to the equation:

$$T_{fbl} = K_p(\omega_{rr} - \omega_{fr}) + K_\alpha(\alpha_{rr} - \alpha_{fr}),$$

determining a left front torque feedback signal, $T_{fbfl}$, equal to (i) zero if the left front wheel speed, $\omega fl$, equals zero, (ii) zero if the left rear wheel speed, $\omega_{rl}$, is zero, (iii) zero if a first ratio, $\omega_{fl}/\omega_{rl}$, is not greater than a predetermined constant, $R_{th}$, which is not less than 1, and (iv) $T_{fbl}$ if the left front wheel speed, $\omega fl$, is greater than the left rear wheel speed, $\omega_{rl}$, neither the left front wheel speed nor the left rear wheel speed equals zero, and $\omega_{fl}/\omega_{rl}$ is greater than $R_{th}$;

determining a left rear torque feedback signal, $T_{fbrl}$, equal to (i) zero if the left front wheel speed, $\omega_{fl}$, equals zero, (ii) zero if the left rear wheel speed, $\omega_{rl}$, is zero, (iii) zero if a second ratio, $\omega_{rl}/\omega_{fl}$, is not greater than $R_{th}$, and (iv) $-T_{fbl}$ if the left front wheel speed, $\omega_{fl}$, is less than the left rear wheel speed, $\omega_{rl}$, neither the left front wheel speed nor the left rear wheel speed equals zero, and $\omega_{rl}/\omega_{fl}$ is greater than $R_{th}$;

determining a right front torque feedback signal, $T_{fbfr}$, equal to (i) zero if the right rear wheel speed, $\omega_{fr}$, equals zero, (ii) zero if the right wheel speed, $\omega_{rr}$, is zero, (iii) zero of a third ratio, $\omega_{fr}/\omega_{rr}$, is not greater than $R_{th}$, and (iv) $T_{fbr}$ if the right front wheel speed, $\omega_{fr}$, is greater than the right rear wheel speed, $\omega_{rr}$, neither the right front wheel speed nor the right rear wheel speed equals zero, and $\omega_{fr}/\omega_{rr}$ is greater than $R_{th}$;

determining a right rear torque feedback signal, $T_{fbrr}$, equal to (i) zero if the right front wheel speed, $\omega_{fr}$, equals zero, (ii) zero if the right rear wheel speed, $\omega_{rr}$, is zero, (iii) zero if a fourth ratio, $\omega_{rr}/\omega_{fr}$, is not greater than $R_{th}$, and (iv) $-T_{fbl}$ if the right front wheel speed, $\omega_{fr}$, is less than the right rear wheel speed, $\omega_{rr}$, neither the right front wheel speed nor the right rear wheel speed equals zero, and $\omega_{rr}/\omega_{fr}$ is greater than $R_{th}$;

determining a front left torque command, $T_{fl}$, according to an equation:

$$T_{Fl} = T_p + T_{fbfl}.$$

determining a rear left torque command, $T_{Rl}$, according to an equation:

$$T_{Rl} = T_p + T_{fbfl}.$$

determining a front right torque command, $T_{Fr}$, according to an equation:

$$T_{Fr} = T_p + T_{fbfr}.$$

determining a rear right torque command, $T_{Rr}$, according to an equation:

$$T_{Rr} = T_p + T_{fbrr};\ \text{and}$$

driving the front left, front right, rear left, and rear right wheels according to the front left, front right, rear left, and rear right torque signals, $T_{Fl}$, $T_{Fr}$, $T_{Rl}$, and $T_{Rr}$, respectively.

* * * * *